(12) United States Patent
Shkatov et al.

(10) Patent No.: US 8,991,294 B2
(45) Date of Patent: Mar. 31, 2015

(54) ARMOR PLATE AND METHOD OF PRODUCING SAME

(75) Inventors: Victor Shkatov, Bat Yam (IL); Zigmund Bluvband, Rishon LeZion (IL)

(73) Assignee: Plystone Ltd., Bat Yam (IL)

( * ) Notice: Subject to any disclaimer, the term of this patent is extended or adjusted under 35 U.S.C. 154(b) by 1047 days.

(21) Appl. No.: 12/571,832

(22) Filed: Oct. 1, 2009

(65) Prior Publication Data
US 2011/0079133 A1    Apr. 7, 2011

(51) Int. Cl.
*F41H 5/04* (2006.01)
*B32B 37/18* (2006.01)
*B32B 3/08* (2006.01)
*B23B 5/26* (2006.01)

(52) U.S. Cl.
CPC ............ *F41H 5/0492* (2013.01); *B32B 3/08* (2013.01); *B23B 5/26* (2013.01); *F41H 5/0428* (2013.01); *F41H 5/0457* (2013.01); *B32B 2305/08* (2013.01); *B32B 2305/18* (2013.01); *B32B 2305/38* (2013.01); *B32B 2307/54* (2013.01); *B32B 2307/718* (2013.01); *B32B 2309/105* (2013.01); *B32B 2571/00* (2013.01); *B32B 2571/02* (2013.01)
USPC ........................ 89/36.02; 422/134; 422/135

(58) Field of Classification Search
CPC ............ B32B 2305/08; B32B 2305/18; B32B 2305/38; B32B 2311/00; B32B 2307/54; B32B 2307/718; B32B 2308/105; B32B 2571/00; B32B 2571/02; B32B 3/08; B32B 5/26; F41H 5/0428; F41H 5/0457; F41H 5/0492
USPC ................................... 442/135, 134; 89/36.02
See application file for complete search history.

(56) References Cited

U.S. PATENT DOCUMENTS

| | | | |
|---|---|---|---|
| 4,836,084 A * | 6/1989 | Vogelesang et al. ......... 89/36.02 |
| 5,824,940 A | 10/1998 | Chediak et al. |
| 6,000,055 A * | 12/1999 | Citterio ............................. 2/2.5 |
| 6,792,843 B2 | 9/2004 | Mohr et al. |
| 6,807,891 B2 | 10/2004 | Fisher |
| 7,077,048 B1 | 7/2006 | Anderson, Jr. et al. |
| 2002/0122927 A1* | 9/2002 | Howland ..................... 428/292.1 |
| 2003/0064191 A1* | 4/2003 | Fisher .............................. 428/49 |
| 2009/0031889 A1 | 2/2009 | Sal et al. |
| 2009/0114083 A1 | 5/2009 | Moore, III et al. |

OTHER PUBLICATIONS

International Search Report and Written Opinion for Application No. PCT/IL10/00783 mailed on Jan. 11, 2011.

* cited by examiner

*Primary Examiner* — Peter Y Choi
*Assistant Examiner* — Vincent A Tatesure
(74) *Attorney, Agent, or Firm* — Vladimir Sherman; Professional Patent Solutions

(57) ABSTRACT

An armor plate comprising alternating protection layers of light-weight high-strength fiber and reinforcing layers of high tensile strength oblong bodies, and a method for production of armor plates, the method comprising: arranging alternating protection layers of light-weight high-strength fabric and reinforcing layers of high tensile strength oblong bodies; and fastening the layers of the construction together.

15 Claims, 4 Drawing Sheets

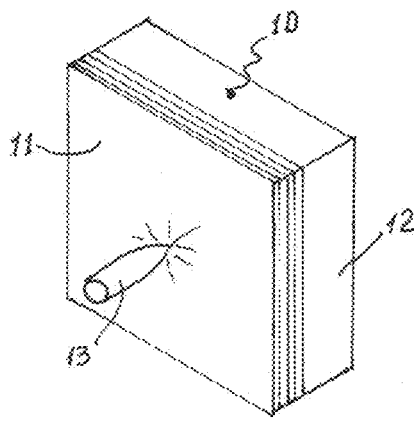
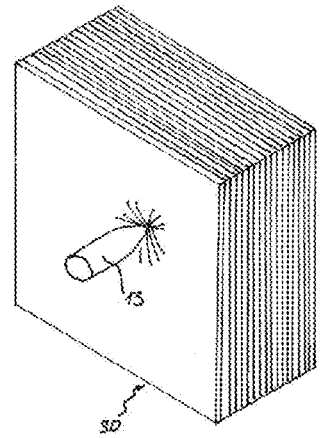
Fig. 1A                    Fig. 2A
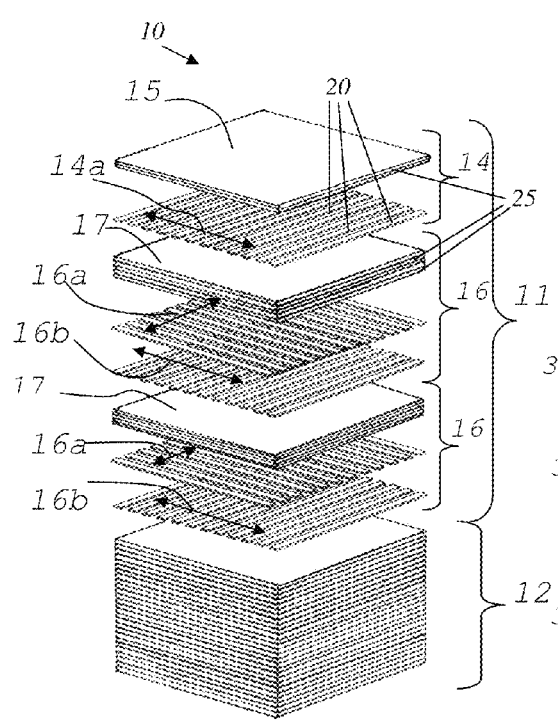
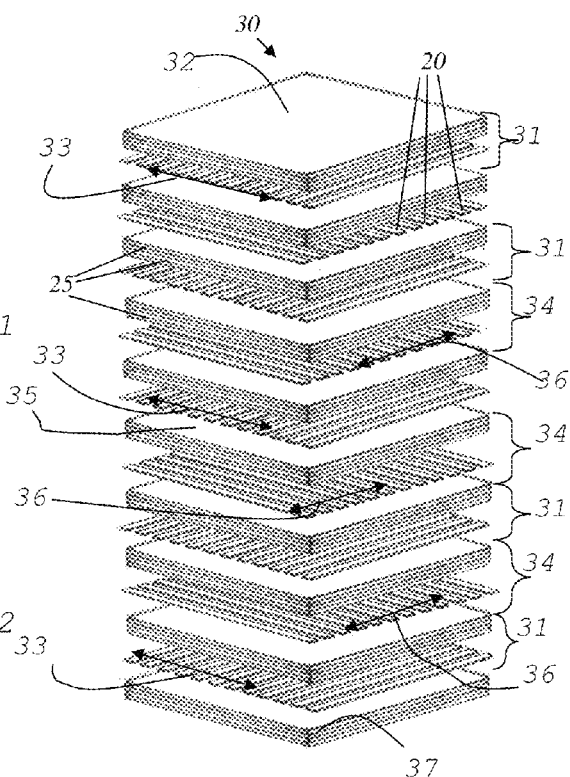
Fig. 1B                    Fig. 2B

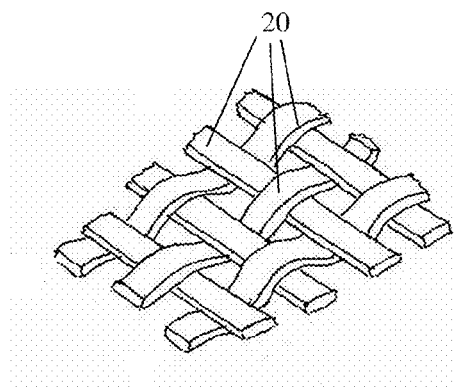
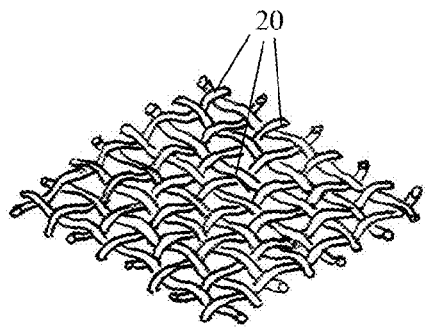
Fig. 3A
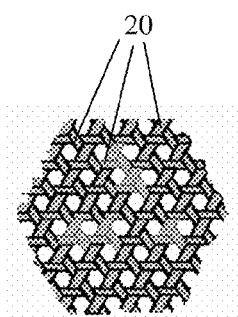
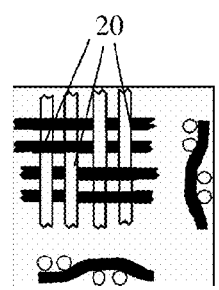
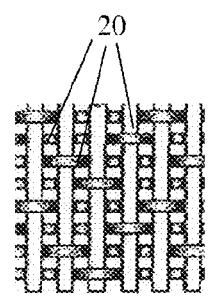
Fig. 3B　　　　　　Fig. 3C　　　　　　Fig. 3D
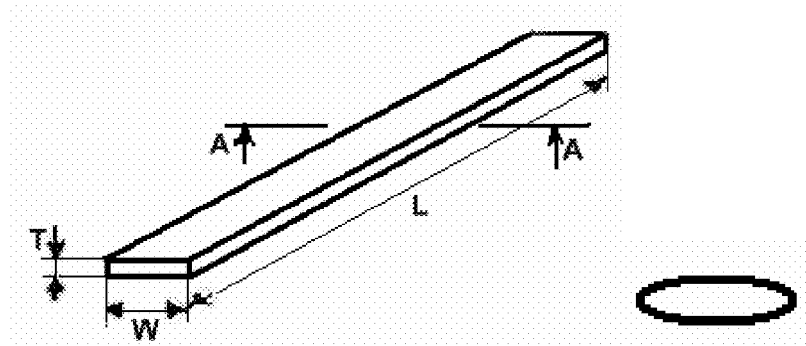
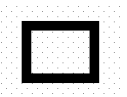
Fig. 4A　　　　　　Fig. 4B　　　　　　Fig. 4C

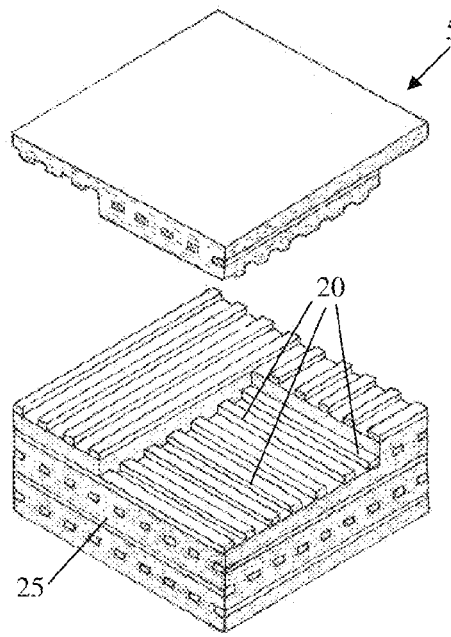 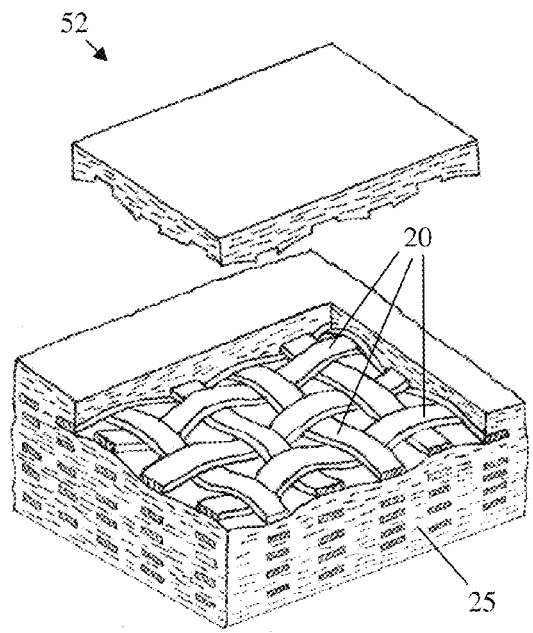
Fig. 5A  Fig. 5B
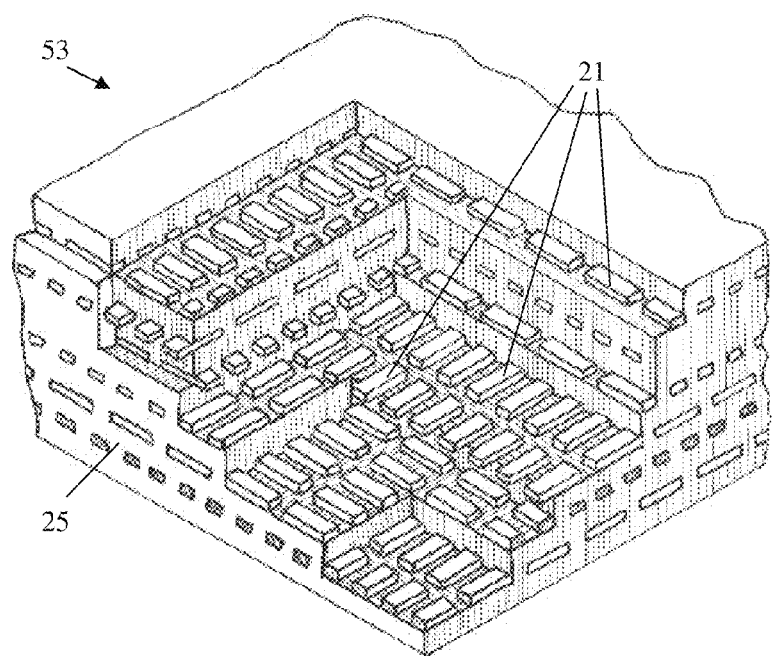
Fig. 6

ARMOR PLATE AND METHOD OF PRODUCING SAME

BACKGROUND OF THE INVENTION

Many known constructed armor plates dissipate the impact energy of a hitting projectile on a large area of an external layer of the armor plate. Therefore, inner layers of the armor plate absorb a smaller amount of energy per area unit and thus, for example, may capture the projectile. The external layer of the armor plate may usually include a stiffen material such as a ceramic plate or a high strength metallic plate.

The existing threats for small targets like man or light vehicles are diverse and complicated. One of the known threats is the Belgium made SS109 bullet. The SS109 is a type of projectiles which uses a compound core with a lead base, and which comprises a hard steel penetrator top with a minimum hardness of 60 HRC, all covered by a copper alloy jacket. The bullet SS109, after leaving the rifle barrel, can reach a velocity of up to 910-975 m/s (depending on the gunpowder) and is equivalent to U.S. Military bullet M855.

Using steel plates for protective purposes may lead to a serious problem of added weight, for example, on light vehicles, which may limit their mobility and shorten its lifetime while increasing the Lifecycle Cost. The large weight of these steel plates may make it impossible to use those plates for personal protection.

Light-weight high-strength fabrics have been developed for armor vests. The lightest and strongest of these materials are Ultra High Weight Molecular Polyethylene (UHWMPE) materials, such as the Spectra® fiber of Honeywell and the Dyneema® fiber of DSM. However, in order to withstand direct stabbing with sharp objects like knives and high velocity penetrators such as a bullet, the UHWMPE armor plates should usually include ceramic or metallic stiffen materials, which make the production of those plates very expensive and/or make those plates too heavy.

Therefore, there is need for armor plates which may provide protection against high velocity penetrators such as small caliber ammunition, for example, with diameter of 5.56 up to 25 mm. These bullets may have high velocity impact, such as more than 870 m/s. Therefore, these bullets may have a great amount of kinetic energy, enabling the bullets to penetrate deeply into a target body. For example, a steel bullet with an impact velocity of 1000 m/s, with diameter of 7.11 mm and weight of 20.4 g, may have a penetration depth into an homogeneous steel plate of up to 45 mm and into an aluminum plate of up to 150 mm.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1A is a schematic illustration of an armor plate according to some embodiments of the present invention;

FIG. 1B is a detailed schematic illustration of an exemplary construction of an armor plate 10 according to some embodiments of the present invention;

FIGS. 2A and 2B are schematic illustrations of another armor plate according to some other embodiments of the present invention;

FIGS. 3A, 3B, 3C and 3D are schematic illustrations of alternative structures of reinforcing layers including high tensile strength oblong bodies, according to embodiments of the present invention;

FIGS. 4A, 4B and 4C depict a schematic illustration of an oblong body and two optional shapes of its cross section, respectively, usable in the construction of armor plates according to embodiments of the present invention;

FIGS. 5A and 5B are schematic cross-sectional perspective illustrations of exemplary two respective constructions of armor plates according to embodiments of the present invention;

FIG. 6 is a schematic cross-sectional perspective illustration of an exemplary construction of another armor plate according to embodiments of the present invention.

Figure 7:
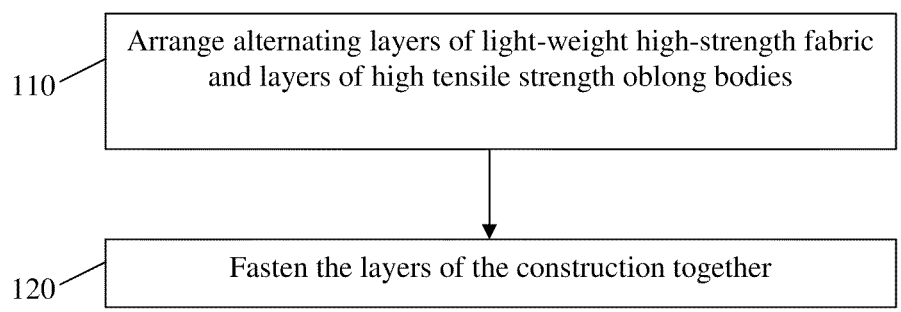
FIG. 7 is a flow chart illustrating a method for production of an armor plate according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Embodiments of the present invention may provide relatively lightweight armor plates which may have the ability to withstand impact of high velocity penetrators.

This may be achieved by insertion of reinforcing means such as high tensile strength oblong bodies, for example metallic oblong bodies, between plies of light-weight high-strength fabric. According to some exemplary embodiments, the light-weight high-strength fabric may have tensile strength of no less than 2.6 GPa. Each ply of the light-weight high-strength fabric may have, according to some exemplary embodiments, a thickness of no less than 200 µm. The light-weight high-strength fabric may include, for example, UHWM polyethylene or any other suitable material with similar properties.

The layers of the light-weight high-strength fabric and the reinforcing means may extend on the entire area which needs protection.

Protection modulated layers which comprise multiple plies of light-weight high-strength fabric may be assembled with reinforcing layers including arrays of high tensile strength oblong bodies, for example metallic oblong bodies, which may have, for example, a rectangular, or square, or oval cross section. According to some exemplary embodiments, the high tensile strength oblong bodies may have a thickness no less than 0.58 mm. In each reinforcing layer, the high tensile strength oblong bodies may be arranged unidirectionally and in parallel to each other. The reinforcing layer may include gaps between the oblong bodies. In each reinforcing layer, the high tensile strength oblong bodies may be arranged perpendicularly to the direction of the oblong bodies of an adjacent or another reinforcing layer. All the modulated and reinforcing layers needed for formation of the armor plate may be fastened together by heating and pressing of all the construction layers together, for example, by using heating and pressing means such as, for example, thermoplastics means.

Reference is now made to FIG. 1A, which is a schematic illustration of an armor plate 10 according to some embodiments of the present invention. Armor plate 10 may provide protection against different types of small caliber ammunition, for example, of the types mentioned above in the background section or other types, which may have high velocity impact, such as more than 870 m/s. Therefore, these bullets may have a great amount of kinetic energy, enabling the bullets to penetrate deeply into a target body.

Armor plate 10 may include a capturing layer 12 and a dissipating layer 11. When a penetrator 13, for example a bullet, collides with dissipating layer 11, dissipating layer 11 may dissipate the kinetic energy of penetrator 13 on an area considerably larger than the cross section area of penetrator 13. Therefore, the velocity of penetrator 13 may be considerably reduced, so as to enable capturing of penetrator 13 by capturing layer 12.

In some embodiments of the present invention, capturing unit 12 may be made of multiple plies of light-weight high-strength fabric. According to some exemplary embodiments, the light-weight high-strength fabric may have tensile strength of no less than 2.6 GPa. Each ply of the light-weight high-strength fabric may have, according to some exemplary embodiments, a thickness of no less than 200 μm. The light-weight high-strength fabric may include, for example, UHWM polyethylene or any other suitable material with similar properties.

As discussed in detail below with reference to FIG. 1B, dissipating layer 11 may include high tensile strength oblong bodies, for example metallic oblong bodies, which may have, for example, a rectangular, or square, or oval cross section. According to some exemplary embodiments, the high tensile strength oblong bodies may have a thickness no less than 0.58 mm. The oblong bodies are assembled to create a reinforced material having high resistance to penetration, for example, of high velocity penetrators such as bullets.

Reference is now made to FIG. 1B, which is a detailed schematic illustration of an exemplary construction of an armor plate 10 according to some embodiments of the present invention. Armor plate 10 may include a capturing layer 12 and a dissipating layer 11. Dissipating layer 11 may include adjacent modulated layers 14 and 16. In the example of FIG. 1B, armor plate 10 may include one modulated layer 14 and two modulated layers 16. However, armor plate 10 may include any other number and/or combination of modulated layers 14 and 16, for example, only modulated layers 14 or only modulated layers 16 or alternation between modulated layers 14 and 16, according to any specific requirements of, for example, strength, weight, resistibility and/or any of other suitable parameter.

Modulated layer 14 may include a face layer 15, which may include multiple fabric layers 25 from light-weight high-strength polymer fiber. Face layer 15 may include, for example, at least two fabric layers 25 in some embodiments of the present invention. According to some exemplary embodiments, the light-weight high-strength fabric layers 25 may have tensile strength of no less than 2.6 GPa. Each ply 25 of the light-weight high-strength fabric may have, according to some exemplary embodiments, a thickness of no less than 200 μm. The light-weight high-strength fabric layers 25 may include, for example, UHWM polyethylene or any other suitable material with similar properties. Additionally, modulated layer 14 may include a reinforcing layer 14a adjacent to face layer 15, which may include an array of high tensile strength oblong bodies 20, for example metallic oblong bodies, which may have, for example, a rectangular, or square, or oval cross section (as shown, for example, in FIGS. 4A, 4B and 4C). According to some exemplary embodiments, each of high tensile strength oblong bodies 20 may have a thickness of no less than 0.58 mm and/or a tensile strength no less than 2.0 GPa. Oblong bodies 20 may be arranged unidirectionally and/or in parallel to each other. Reinforcing layer 14a may include gaps between oblong bodies 20. In some embodiments of the present invention, oblong bodies 20 may be arranged with gaps of at least 0.15 mm between oblong bodies 20. The width and length of reinforcing layer 14a may be substantially similar to the width and length of face layer 15, respectively. Modulated layer 14 may enable precise construction of armor plate 10 by balancing the strength and weight of armor plate 10 by choosing the number and position of modulated layers 14.

Each of modulated layers 16 may include intermediate layer 17, which may include multiple fabric layers 25 of light-weight high-strength fiber which may be similar to fabric layers 25 of face layer 15. Intermediate layer 17 may include, for example, at least five fabric layers 25 in some embodiments of the present invention. Additionally, each modulated layer 16 may include reinforcing layers 16a and 16b adjacent to intermediate layer 17, each of which may include an array of high tensile strength oblong bodies 20, which may be similar to oblong bodies 20 of reinforcing layer 14a. Reinforcing layers 16a and 16b may be substantially similar to reinforcing layer 14a. Oblong bodies 20 of reinforcing layer 16a may be directed perpendicularly to the direction of oblong bodies 20 of reinforcing layer 14a. Oblong bodies 20 of reinforcing layer 16b may be directed perpendicularly to the direction of oblong bodies 20 of reinforcing layer 16a. The width and length of each of reinforcing layers 16a, 16b and intermediate 17 may be substantially similar to the width and length of face layer 15, respectively.

Capturing layer 12 may include multiple fabric layers 25 of light-weight high-strength fiber which may be similar to fabric layers 25 of face layer 15. Capturing layer 12 may include, for example, at least thirty five fabric layers 25 in some embodiments of the present invention.

Reference is now made to FIGS. 2A and 2B, which are schematic illustrations of an armor plate 30 according to some other embodiments of the present invention. Armor plate 30 may provide protection against small caliber ammunition, for example up to 25 mm. FIG. 2B is a detailed schematic illustration of an exemplary construction of an armor plate 30 according to some embodiments of the present invention. Plate 30 may include a plurality of alternating modulated layers 31 and 34. Each of modulated layers 31 may include layer 32, which may include multiple fabric layers 25 of light-weight high-strength fabric which may be similar to fabric layers 25 described in detail above with reference to FIG. 1B. Layer 32 may include, for example, at least five fabric layers 25 in some embodiments of the present invention. Additionally, each modulated layer 31 may include a reinforcing layer 33 adjacent to layer 32, each of which may include an array of high tensile strength oblong bodies 20, which may be similar to oblong bodies 20 described in detail above with reference to FIG. 1B. Similarly to reinforcing layers 14a, 16a and 16b described above with reference to FIG. 1B, oblong bodies 20 may be arranged unidirectionally and/or in parallel to each other. Reinforcing layer 33 may include gaps between oblong bodies 20. In some embodiments of the present invention, oblong bodies 20 may be arranged with gaps of at least 0.15 mm between bodies 20.

The width and length of layer 33 may be substantially similar to the width and length of layer 32, respectively.

Each of modulated layers 34 may include layer 35, which may include multiple fabric layers 25 of light-weight high-strength fiber which may be similar to fabric layers 25 described in detail above with reference to FIG. 1B. Layer 35 may include, for example, at least five fabric layers 25 in some embodiments of the present invention. Additionally, each modulated layer 34 may include a reinforcing layer 36 adjacent to layer 35, each of which may include an array of high tensile strength oblong bodies 20, which may be similar to oblong bodies 20 described in detail above with reference to FIG. 1B. Reinforcing layer 36 may be substantially similar to reinforcing layer 33. Oblong bodies 20 of reinforcing layer 36 may be directed perpendicularly to the direction of oblong bodies 20 of reinforcing layer 33. The width and length of modulated layer 34 may be substantially similar to the width and length of modulated layer 31, respectively.

Alternating modulated layers 31 and/or 34 may be assembled on a base layer 37, which may include multiple fabric layers 25 of light-weight high-strength fiber which may be similar to fabric layers 25 described in detail above with reference to FIG. 1B. Layer 35 may include, for example, at least ten fabric layers 25 in some embodiments of the present invention.

The desired number of alternating modulated layers 31 and 34 may be determined based on the required resistibility against specific penetrators. The desired number of alternating modulated layers 31 and 34 may be determined, for example, according to the penetrability of projectile 13, which may be estimated according to parameters such as the caliber of the projectile, weight of the projectile, estimated velocity of the projectile, and/or any other suitable parameter indicative of the penetrability of the projectile. In the example of FIG. 2B, there are five modulated layers 31 and four modulated layers 34. However, any other number of alternating modulated layers 31 and 34 may be used, for example, according to any specific requirements of, for example, strength, weight, resistibility and/or any of other suitable parameter. Additionally, the number of fabric layers 25 included in base layer 37 or in any other layer including multiple fabric layers 25 may be similarly determined based on any requirement of, for example, strength, weight, resistibility and/or any of other suitable parameter.

Reference is now made to FIGS. 3A, 3B, 3C and 3D, which are schematic illustrations of alternative structures of reinforcing layers including high tensile strength oblong bodies 20. FIGS. 3A, 3B, 3C and 3D illustrate different lattice and/or grid structures which may be produced to form the reinforcing layers. The different lattice and/or grid structures may include, for example, plain weave, basket weave, triaxial weave, double weave, and/or any other suitable kind of lattice and/or grid structures.

Reference is now made to FIGS. 5A and 5B, which are schematic cross-sectional perspective illustrations of exemplary constructions 51 and 52 of armor plates according to embodiments of the present inventions. Construction 51 may include layers of high tensile strength oblong bodies 20 arranged unidirectionally and/or in parallel to each other, in between multiple fabric layers 25 of light-weight high-strength fiber. As shown in FIG. 5A, the direction of high strength oblong bodies 20 in each layer is substantially perpendicular to the direction of high strength oblong bodies 20 in adjacent and/or other layers of high strength oblong bodies 20.

Construction 52 may include layers of high tensile strength oblong bodies 20 weaved in a lattice structure. The lattice and/or grid structure may include, for example, plain weave, basket weave, triaxial weave, double weave, and/or any other suitable kind of lattice and/or grid structures. The layers of high tensile strength oblong bodies 20 may be arranged in between multiple fabric layers 25 of light-weight high-strength fiber.

Reference is now made to FIG. 6, which is a schematic cross-sectional perspective illustration of an exemplary construction 53 of an armor plate according to embodiments of the present inventions. In some embodiments of the present invention, each of oblong bodies 20 described in detail above may possibly include several pieces 21 of high tensile strength material, connected to each other in series or aligned with predetermined gap between them. Construction 53 may include reinforcing layers of high tensile strength oblong pieces 21 arranged unidirectionally and/or in parallel to each other, in between multiple fabric layers 25 of light-weight high-strength fibers. In some exemplary embodiments of the present invention, the length of each of oblong pieces 21 should be no less then 10 mm. The lengths of oblong pieces 21 and the gaps between them in longitudinal direction may be no less then 1 mm, thus creating intermittent rows within the reinforcing layers. The rows of oblong pieces 21 may be arranged unidirectionally and/or in parallel to each other. The mutuality disposition of the reinforcing layers may be perpendicular to each other. The lengths of oblong pieces 21 and the gaps between them may very within the layers and from one layer to another. For example, oblong pieces 21 may be arranged with repeating combinations of lengths and gaps of oblong pieces 21, for example, big-small-big-small-etc., big-big-small-big-big-small-etc., and/or any other possible combinations of lengths and gaps of oblong pieces 21. Moreover, oblong pieces 21 in each layer may be displaced relative to oblong pieces 21 in adjacent and/or other layers of oblong pieces 21. Displacement of oblong pieces 21 in one layer relative to oblong pieces 21 in other layers may enable achieving substantially full coverage by oblong pieces 21 of the protected area, which may enable a better protection against penetrators.

As discussed above, embodiments of the present invention may provide relatively lightweight armor plates which may have the ability to withstand impact of high velocity penetrators. For example, a plate such as plate 10 of FIG. 1B may include the necessary amount of plies of polymer fabric having dimensions of, for example, 300×250 mm and, for example, steel alloy oblong bodies, for example, with rectangular cross-section as in FIG. 4A, with dimensions of 4×0.75×300 mm for longitudinal oblong bodies and 4×0.75×250 mm for transverse oblong bodies. The steel alloy oblong bodies may be heat-treated to a required hardness, for example, of HRC 53 minimum. The layers of polymer fabric and of the oblong bodies may be arranged as in the example shown in FIG. 1B. The layers may be assembled together by pressing and heating all the layers together, for example under pressure of at least 200 bar and temperature of at least 40° C. The produced armor plate may have specific mass of 34.4 kg/m$^2$ and a thickness of 22 mm. Such armor plate may stand high velocity penetrators, i.e. prevent piercing and/or penetration through the plate of high velocity penetrators, for example, bullets which may have impact velocity of at least 940 m/s, for example, the Belgium made SS109 bullet described in the background.

In another example, the plate dimensions may be 220×220×24 mm and the plate may have specific weight of 34.5 kg/m$^2$. Such armor plate may stand high velocity penetrators, i.e. prevent piercing and/or penetration through the plate of high velocity penetrators, for example, bullets which may have impact velocity of at least 940 m/s and/or impact energy of at least 1700 J, for example, the Belgium made SS109 bullet described in the background.

Reference is now made to FIG. 7, which is a flow chart illustrating a method for production of an armor plate according to some embodiments of the present invention. According to block 110, the method may include arranging alternating protection layers of light-weight high-strength fabric 25 and reinforcing layers of high tensile strength oblong bodies 20, for example according to a desired construction of the armor plate. For example, the construction may be similar to one of the constructions shown in FIGS. 1B, 2B, 5A, 5B and 6, or any other suitable construction. The specific construction, e.g., number of layers, order of layers, and kind of layers may be determined according to the required strength, weight, resistibility against penetrators and/or any of other suitable parameter. The desired number of the alternating layers may be determined, for example, according to the penetrability of the projectile, which may be estimated according to parameters such as the caliber of the projectile, weight of the projectile, estimated velocity of the projectile, and/or any other suitable parameter indicative of the penetrability of the projectile.

According to block 120, the method may include fastening the layers of the construction together, for example by heating and pressing all the layers of the construction together.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. An armor plate comprising:
   a rigid dissipating layer comprised of:
      a composition of alternating metallic and fabric layers forming a rigid armor plate capable of withstanding impact of an impacting projectile having a diameter of 5.56 mm and impact energy of 1700 joules, said fabric layers being comprised of multiple plies of non-metallic fabric having a tensile strength of at least 2.6 Giga Pascals (GPa) and said metallic layers being comprised of arrays of oblong metal bars arranged unidirectionally and in parallel to each other, which oblong metal bars are elongated, such that their length is at least a magnitude larger than their other dimensions, have a thickness of at least 0.58 mm, a tensile strength of at least 2 GPa, a hardness of at least HRC 53 and gaps between them, wherein: (1) said metallic layers are each contiguous to adjacent fabric layers and affixed in place by them such that said metal bars remain affixed in place in relation to said fabric layers when impacted by the impacting projectile (2) said withstanding of said impact is achieved by said composition of said metallic and said non-metallic layers and (3) an orientation of said oblong metal bars in at least one of said metallic layers is substantially perpendicular to an orientation of oblong metal bars in another metallic layer; and
   a capturing layer comprised of fabric layers including multiple plies of non-metallic fabric.

2. An armor plate according to claim 1, wherein said layers are fastened together by heating and pressing.

3. An armor plate according to claim 1, wherein said perpendicular metallic layers are separated by at least one of said fabric layers.

4. An armor plate according to claim 1, wherein said oblong metal bars have a rectangular or oval cross section.

5. An armor plate according to claim 1, comprising at least two of said metallic layers and at least two of said fabric layers arranged in alternating contiguous metallic and fabric layers.

6. A method for production of armor plates, the method comprising:
   arranging alternating metallic and fabric layers contiguously, said fabric layers being comprised of non-metallic fabric having a tensile strength of at least 2.6 Giga Pascals (GPa) and said metallic layers being comprised of arrays of oblong metal bars arranged unidirectionally and in parallel to each other, which oblong metal bars are elongated, such that their length is at least a magnitude larger than their other dimensions, have a thickness of at least 0.58 mm, a tensile strength of at least 2 GPa, a hardness of at least HRC 53 and gaps between them, wherein said metallic layers are each contiguous to adjacent fabric layers; and
   fastening the layers together to create a composition of alternating metallic and fabric layers forming a rigid armor plate capable of withstanding impact of an impacting projectile having a diameter of 5.56 mm and impact energy of 1700 joules and a capturing layer comprised of fabric layers including multiple plies of non-metallic fabric;
   wherein: (1) said metallic layers are affixed in place by the fabric layers such that said metal bars remain affixed in place in relation to said fabric layers when impacted by the impacting projectile (2) said withstanding of said impact is achieved by said composition of said metallic and said non-metallic layers and (3) an orientation of said oblong metal bars in at least one of said metallic layers is substantially perpendicular to an orientation of oblong metal bars in another metallic layer.

7. A method according to claim 6, wherein said fastening is performed by heating and pressing said layers together.

8. A method according to claim 6, wherein said perpendicular metallic layers are separated by at least one of said fabric layers.

9. A method according to claim 6, wherein at least two of said metallic layers are each comprised of oblong metal bars having an orientation substantially perpendicular to an orientation of oblong metal bars in another metallic layer, forming two pairs of perpendicular layers.

10. A method according to claim 6, wherein said oblong metal bars have a rectangular or oval cross section.

11. A method according to claim 6, wherein at least five of said metallic layers and at least five of said fabric layers are arranged in alternating contiguous layers and fastened together.

12. An armor plate according to claim 1, comprising at least five of said metallic layers and at least five of said fabric layers arranged in alternating contiguous metallic and fabric layers.

13. An armor plate according to claim 3, wherein at least two of said metallic layers are each comprised of oblong metal bars having an orientation substantially perpendicular to an orientation of oblong metal bars in another metallic layer, forming two pairs of perpendicular layers.

14. An armor plate according to claim 13, wherein said two pairs of perpendicular layers are displaced in relation to each other.

15. An armor plate according to claim 1, having a weight of 35 kg/m$^2$ or less.

* * * * *